United States Patent
Yao

(10) Patent No.: US 11,143,813 B2
(45) Date of Patent: Oct. 12, 2021

(54) CASING AND ELECTRONIC DEVICE WITH TRANSPARENT DECORATIVE STRUCTURE MEMBER AND LIGHT GUIDE FILM

(71) Applicant: GUANGDONG OPPO MOBILE TELECOMMUNICATIONS CORP., LTD., Guangdong (CN)

(72) Inventor: Kun Yao, Guangdong (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 21 days.

(21) Appl. No.: 16/926,112

(22) Filed: Jul. 10, 2020

(65) Prior Publication Data

US 2020/0341184 A1 Oct. 29, 2020

Related U.S. Application Data

(63) Continuation of application No. PCT/CN2019/072696, filed on Jan. 22, 2019.

(30) Foreign Application Priority Data

Apr. 19, 2018 (CN) .......................... 201810359123.2
Apr. 19, 2018 (CN) .......................... 201820568908.6

(51) Int. Cl.
*F21V 8/00* (2006.01)

(52) U.S. Cl.
CPC ......... *G02B 6/0061* (2013.01); *G02B 6/0088* (2013.01)

(58) Field of Classification Search
CPC .............. F21V 33/0052; G02B 6/0061; G02B 6/0088; G02F 1/133611; H04M 2215/8141; H04M 1/0283; H04M 1/22
See application file for complete search history.

(56) References Cited

U.S. PATENT DOCUMENTS

| | | | |
|---|---|---|---|
| 2009/0190990 A1* | 7/2009 | Chang .................... | B29C 41/20 400/490 |
| 2009/0284397 A1* | 11/2009 | Lee ........................ | G06F 3/0238 341/23 |
| 2010/0039826 A1 | 2/2010 | Su et al. | |

(Continued)

FOREIGN PATENT DOCUMENTS

| CN | 101881418 A | 11/2010 |
|---|---|---|
| CN | 201666517 U | 12/2010 |

(Continued)

OTHER PUBLICATIONS

International search report,PCT/CN2019/072696, dated Apr. 25, 2019 (3 pages).

(Continued)

*Primary Examiner* — Keith G. Delahoussaye

(57) ABSTRACT

A casing having a light guide structure and an electronic device having the light guide structure are provided. The light guide structure includes a transparent decorative member and a light guide film which are attached together. At least one light entrance is provided on the light guide film for guiding light emitted by a light-emitting source into the light guide film. Screen printing processing is performed on a first surface of the transparent decorative member attached to the light guide film, so that the light entering at the light entrance of the light guide film uniformly exits from the transparent decorative member.

18 Claims, 6 Drawing Sheets

(56) References Cited

U.S. PATENT DOCUMENTS

| | | | |
|---|---|---|---|
| 2010/0128494 A1* | 5/2010 | Moon | G02B 6/0088 |
| | | | 362/605 |
| 2011/0228554 A1 | 9/2011 | Watanabe et al. | |
| 2012/0055770 A1* | 3/2012 | Chen | H01H 13/83 |
| | | | 200/310 |
| 2012/0275160 A1 | 11/2012 | Tada et al. | |
| 2013/0051076 A1 | 2/2013 | Mizuno et al. | |
| 2013/0114296 A1 | 5/2013 | Zheng et al. | |
| 2014/0355305 A1 | 12/2014 | Sakai | |
| 2015/0117059 A1 | 4/2015 | Chun et al. | |
| 2016/0225549 A1* | 8/2016 | Liu | G06F 3/0202 |

FOREIGN PATENT DOCUMENTS

| | | |
|---|---|---|
| CN | 103118152 A | 5/2013 |
| CN | 203686890 U | 7/2014 |
| CN | 105445847 A | 3/2016 |
| CN | 207116282 U | 3/2018 |
| CN | 108508524 A | 9/2018 |
| CN | 208384165 U | 1/2019 |
| EP | 2200261 A1 | 6/2010 |
| WO | 2014114066 A1 | 7/2014 |

OTHER PUBLICATIONS

Extended European Search Report for European Application No. 19787750.9 dated Dec. 7, 2020.

Indian Examination Report for IN Application No. 202017026874 dated Jun. 30, 2021 (5 pages).

European Examination Report for European Application No. EP19787750.9; dated Jul. 29, 2021; pp. 1-6.

* cited by examiner

CASING AND ELECTRONIC DEVICE WITH TRANSPARENT DECORATIVE STRUCTURE MEMBER AND LIGHT GUIDE FILM

CROSS-REFERENCE TO RELATED APPLICATION(S)

The present disclosure is a continuation application of International (PCT) Patent Application No. PCT/CN2019/072696, filed on Jan. 22, 2019, which claims priority to Chinese Patent Application No. 201810359123.2, filed on Apr. 19, 2018, and Chinese Patent Application No. 201820568908.6, filed on Apr. 19, 2018; the entire contents of all of which are hereby incorporated by reference in their entireties.

TECHNICAL FIELD

The present disclosure relates to an optical structure, and in particular, to a casing having a light guide structure and an electronic device having the light guide structure.

BACKGROUND

Existing electronic devices, such as mobile phones, tablet computers, and so on, have event reminder functions such as call reminder, short message reminder, and the like. In order to achieve corresponding event reminder functions, existing electronic devices indicate using indicator lights, so as to remind users of events such as unread information, missed calls, and the like. However, existing indicator lights are all disposed on front screens of electronic devices and require occupying certain positions, so that improvement of screen-to-body ratios of the electronic devices is affected. In addition, existing indicator lights guide light to exit by disposing light guide columns, which is prone to cause the problem of uneven light.

SUMMARY

The present disclosure provides a light guide structure, a casing, and an electronic device.

In one aspect, a casing is provided. The casing comprises a frame and a light guide structure disposed on the frame. The light guide structure comprises a transparent decorative member and a light guide film which are attached together, at least one light entrance is provided on the light guide film for guiding light emitted by a light-emitting source; a first surface of the transparent decorative member attached to the light guide film is provided with an ink area, so that the light entering at the light entrance of the light guide film uniformly exits from the transparent decorative member.

In another aspect, an electronic device is provided. The electronic device comprises a middle frame comprising at least one side plate, wherein the side plate is configured to disposed on a periphery of the electronic device; a light-emitting source disposed on an inner side of the side plate; and a light guide structure disposed on an outer side of the side plate; wherein, the light-emitting source and the light guide structure are respectively disposed at two opposite sides of the side plate, and the light guide structure is configured to guide light emitted from the light-emitting source to outside of the frame.

In another aspect, an electronic device is provided. The electronic device comprises: a casing comprising a side plate, the side plate having a first surface and a second surface being opposite to the first surface, and the side plate recessing from the first surface towards the second surface to define a recess; a light guide assembly disposed in the recess; and a light-emitting source arranged on the second surface and received in the casing, wherein the light-emitting source and the light guide assembly are respectively located at two sides of the second surface, and the light guide assembly is configured to guide light emitted from the light emitting source to outside of the casing.

BRIEF DESCRIPTION OF DRAWINGS

In order to describe technical solutions of embodiments of the present disclosure more clearly, drawings required being used in the embodiments will be simply introduced below. Obviously, the drawings in the following description are merely some embodiments of the present disclosure. For one of ordinary skill in the art, it is also possible to obtain other drawings according to these drawings without paying any creative work.

DETAILED DESCRIPTION

Figure 1:
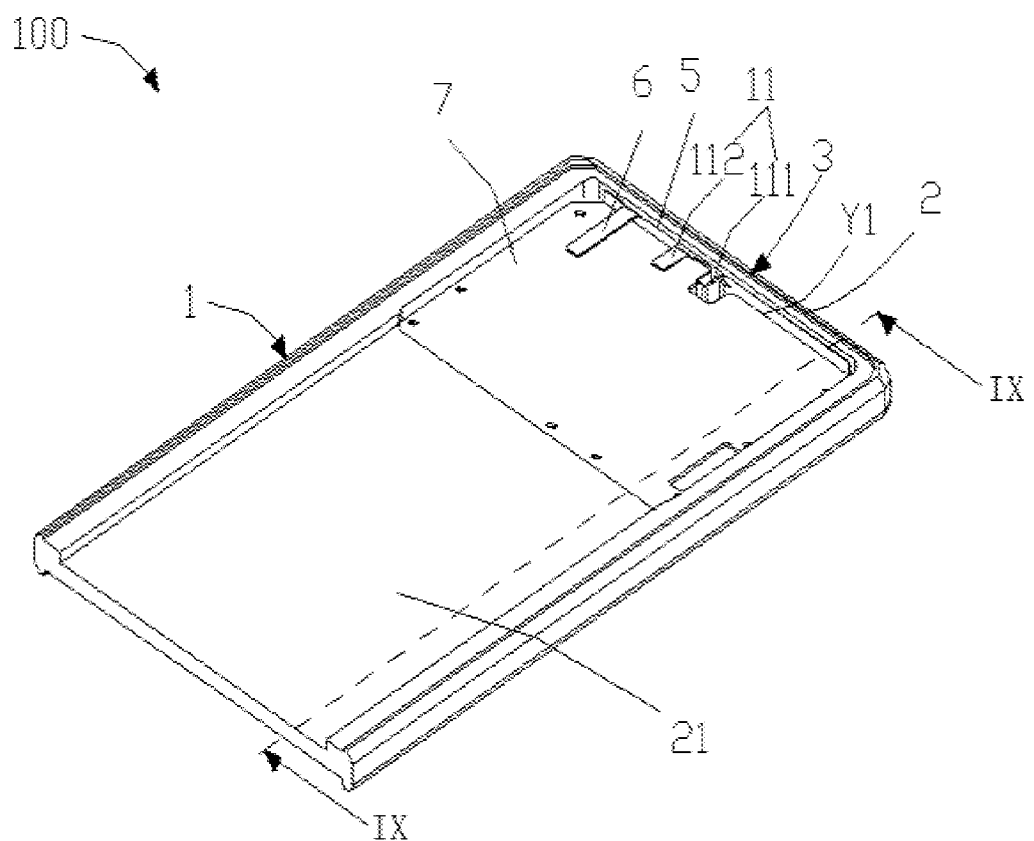
FIG. 1 is a structural schematic view of an electronic device of an embodiment of the present disclosure, of which the structure is partially shown in a view angle.

Technical solutions in embodiments of the present disclosure will be described clearly and completely below in accompany with drawings in embodiments of the present disclosure. Obviously, the described embodiments are merely some embodiments of the present disclosure, but not all embodiments. Based on embodiments of the present disclosure, all other embodiments obtained by one of ordinary skill in the art without paying any creative work belong to the protection scope of the present disclosure.

In the description of the embodiments of the present disclosure, it should be understood that the orientation or positional relationship indicated by the term "thickness" or the like is based on the orientation or positional relationship shown in the drawings, and is only for the convenience of describing the present disclosure and simplifying the description, but not intended to imply or indicate that the indicated device or element must have a specific orientation or be constructed and operated in a specific orientation, and therefore cannot be construed as a limitation to the present disclosure.

According to a first aspect of the present disclosure, a casing is provided. The casing comprises a frame and a light guide structure disposed on the frame; wherein, the light guide structure comprises a transparent decorative member and a light guide film which are attached together, at least one light entrance is provided on the light guide film for guiding light emitted by a light-emitting source; a first surface of the transparent decorative member attached to the light guide film is provided with an ink area, so that the light entering at the light entrance of the light guide film uniformly exits from the transparent decorative member.

In some embodiments, a thickness of a part of the ink area formed on a position on the first surface corresponding to each light entrance of the light guide film is larger than a thickness of a part of the ink area formed on other positions on the first surface.

In some embodiments, the ink area comprises a first layer of ink formed on the whole first surface of the transparent decorative member attached to the light guide film, and at least one second layer of ink formed on the first layer of ink and at a position corresponding to each light entrance.

In some embodiments, the light guide structure further comprises light shielding glue, the light shielding glue is attached to a surface of the light guide film which is away from the transparent decorative member, the light shielding glue is provided with at least one opening, the position of the at least one opening respectively corresponds to the position of the at least light entrance for light of the light-emitting source to pass.

In some embodiments, the at least one light entrance of the light guide film comprises an aperture, and a plurality of spacedly distributed protrusions extend from an aperture wall.

In some embodiments, the frame defines at least one frame hole, a position of the at least one frame hole corresponds to a position of the at least one light entrance of the light guide film.

According to a second aspect of the present disclosure, an electronic device is provided. The electronic device comprises a middle frame comprising at least one side plate, wherein the side plate is configured to disposed on a periphery of the electronic device; a light-emitting source disposed on an inner side of the side plate; and a light guide structure disposed on an outer side of the side plate; wherein, the light-emitting source and the light guide structure are respectively disposed at two opposite sides of the side plate, and the light guide structure is configured to guide light emitted from the light-emitting source to outside of the frame.

In some embodiments, the light guide assembly comprises a transparent decorative member and a light guide film which are attached together, the light guide film defines at least one light entrance configured for guiding light emitted by the light-emitting source, and the transparent decorative member has a printing surface which is provided with an ink area; a thickness of a part of the ink area formed on a position of the printing surface corresponding to each light entrance of the light guide film is larger than a thickness of a part of the ink area formed on other positions of the printing surface.

In some embodiments, wherein, the ink area comprises a first layer of ink formed on the whole printing surface of the transparent decorative member attached to the light guide film, and at least one second layer of ink formed on the first layer of ink and at a position corresponding to each light entrance.

In some embodiments, a part of the outer side of the side plate recesses to form a recess, the light guide structure is disposed in the recess, and an outer surface of the light guide structure is flush with another part of the outer side of the side plate.

In some embodiments, the middle frame comprises at least three side plates and a back plate connected with the side plates, the light guide structure is disposed on one of the side plates; the back plate is connected with parts of the side plates being close to middle parts thereof, so as to form a bearing plate positioned at a middle part of the electronic device.

According to a third aspect of the disclosure, an electronic device is provided. The electronic device comprises: a casing comprising a side plate, the side plate having a first surface and a second surface being opposite to the first surface, and the side plate recessing from the first surface towards the second surface to define a recess; a light guide assembly disposed in the recess; and a light-emitting source arranged on the second surface and received in the casing, wherein the light-emitting source and the light guide assembly are respectively located at two sides of the second surface, and the light guide assembly is configured to guide light emitted from the light emitting source to outside of the casing.

In some embodiments, the light guide assembly comprises a transparent decorative member and a light guide film which are attached together, at least one light entrance is provided on the light guide film for guiding light emitted by the light-emitting source; a printing surface of the transparent decorative member is provided with an ink area configured to make brightness of light passing through the transparent decorative member and emitting from the printing surface be balanced.

In some embodiments, a thickness of a part of the ink area formed on a position of the printing surface corresponding to each light entrance of the light guide film is larger than a thickness of a part of the ink area formed on other positions of the printing surface.

In some embodiments, the ink layer comprises a first layer of ink formed on the whole printing surface of the transparent decorative member attached to the light guide film, and at least one second layer of ink formed on the first layer of ink and at a position corresponding to each light entrance.

In some embodiments, the light guide assembly further comprises light shielding glue, the light shielding glue is attached to a surface of the light guide film which is not attached to the transparent decorative member, the light shielding glue is provided with at least one opening, the position of the at least one opening respectively corresponds to the position of the at least light entrance for light of the light-emitting source to pass.

In some embodiments, one surface of the light shielding glue is adhered and attached to the light guide film, another surface of the light shielding glue is adhered to a bottom surface of the recess so that the light guide assembly is tightly fixed in the recess.

In some embodiments, the casing defines at least one frame hole, the position of the at least one frame hole corresponds one by one to the position of the at least one light entrance of the light guide film; the light-emitting source comprises at least one light emission lamp, each light emission lamp is arranged to correspond to one frame hole.

In some embodiments, the electronic device further comprises an adapter plate, the at least one light emission lamp is disposed on the adapter plate and electrically connected with the adapter plate; a part of the at least one light emission lamp being away from the adapter plate is embedded in a corresponding frame hole.

In some embodiments, the electronic device further comprises a flexible circuit board and a main circuit board, the flexible circuit board is electrically connected with the adapter plate and the main circuit board, the at least one light emission lamp is electrically connected with the main circuit board through the adapter plate and the flexible circuit board, so as to obtain electric energy from the main circuit board and emit light.

Figure 2:
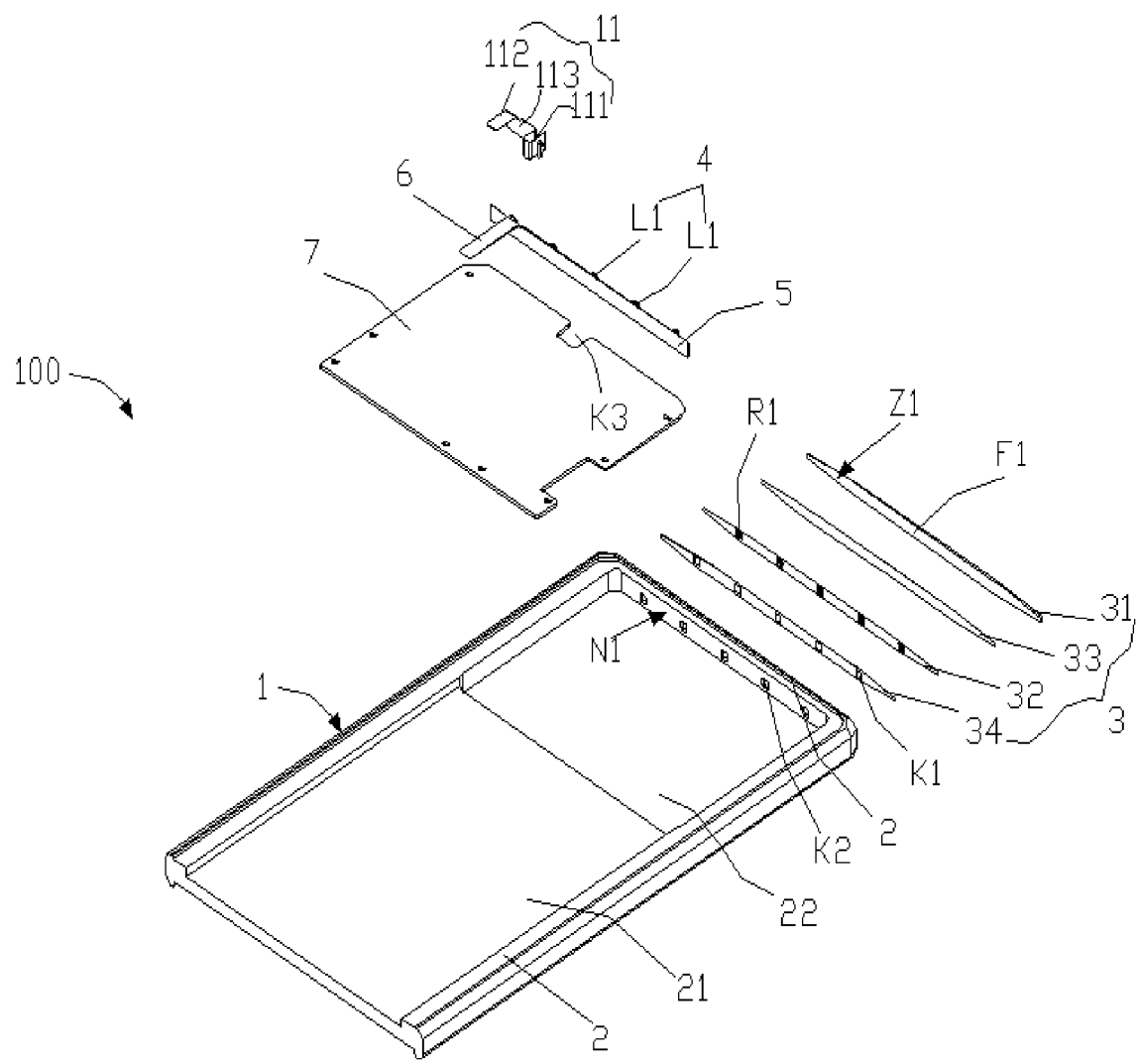
FIG. 2 is a disassembled schematic view of an electronic device of an embodiment of the present disclosure, of which the structure is partially shown in the view angle shown as FIG. 1.

Referring to both FIG. 1 and FIG. 2, FIG. 1 is a plan schematic view of an electronic device 100 of an embodiment of the present disclosure, of which the structure is partially shown in a view angle. FIG. 2 is a disassembled schematic view of the electronic device 100 of an embodiment of the present disclosure, of which the structure is partially shown in the view angle shown as FIG. 1. The electronic device 100 comprises a casing 1, the casing 1 comprises a frame 2 and a light guide structure 3 disposed on the frame 2. The frame 2 may be a side plate configured to be disposed on a periphery of the electronic device 100. The light guide structure 3 may also be named as "light guide assembly".

As shown in FIG. 2, the light guide structure 3 comprises a transparent decorative member 31 and a light guide film 32 which are attached together, at least one light entrance R1 is provided on the light guide film 32 for guiding light emitted by a light-emitting source 4 (as shown in FIG. 2). Screen printing processing is performed on a first surface F1 of the transparent decorative member 31 attached to the light guide film 32, so that the first surface F1 is provided with an ink area configured to make brightness of light passing through the transparent decorative member and emitting from the first surface be balanced, and thus the light entering at the light entrance R1 of the light guide film 32 uniformly exits from the transparent decorative member 31.

Thus, in the present disclosure, by disposing the light guide structure 3 on the frame 2 of the casing 1, light of the light-emitting source 4 is guided to exit from the light guide structure 3 on the frame 2, and indication can be generated by the frame emitting light; it is not required to define indicator light apertures on a front-screen of the electronic device 100, and the screen-to-body ratio can be effectively improved. In addition, by performing screen printing processing on a first surface F1 of the transparent decorative member 31 attached to the light guide film 32, it is possible to effectively make the light entering at the light entrance R1 of the light guide film 32 uniformly exit from the transparent decorative member 31, and light emission uniformity is effectively improved.

In this embodiment, the transparent decorative member 31 is positioned at the outermost side of the frame 2, and provides effect of an appearance decorative surface and a light emission surface.

In some embodiments, the performing screen printing processing on a first surface F1 of the transparent decorative member 31 attached to the light guide film 32 comprises: performing screen printing processing on a first surface F1 of the transparent decorative member 31 attached to the light guide film 32, wherein, a thickness of a part of the ink area screen-printed on a position Z1 on the first surface corresponding to each light entrance R1 of the light guide film is a first thickness, a thickness of a part of the ink area screen-printed on other positions on the first surface is a second thickness, and the first thickness is larger than the second thickness.

Thus, since the ink screen-printed on the position Z1 on the first surface F1 of the transparent decorative member 31 corresponding to each light entrance R1 of the light guide film is thicker, light directly entering through the light entrance R1 can be effectively reduced, such that the light emission brightness at the position Z1 on the first surface F1 of the transparent decorative member 31 corresponding to each light entrance R1 of the light guide film keeps in balance with that of other positions, and uniformity of light emission is improved.

Figure 3:
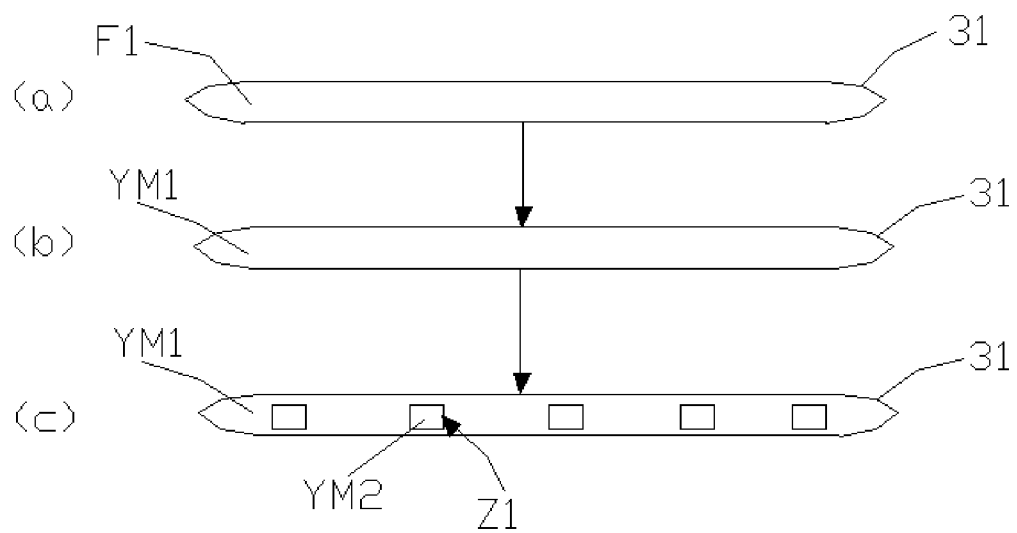
FIG. 3 is a schematic view of a process of performing screen printing processing for a transparent decorative member of an embodiment of the present disclosure.

Further, also referring to FIG. 3, which is a schematic view of a process of performing screen printing processing for the transparent decorative member 31. As shown in FIG. 3, further, the performing screen printing processing on a first surface F1 of the transparent decorative member 31 attached to the light guide film 32 comprises: as shown in (a) and (b) in FIG. 3, first, performing a first screen printing process as a whole on the first surface F1 of the transparent decorative member 31 attached to the light guide film 32 to screen-print a first layer of ink YM1 as a whole; afterwards, as shown in (c) in FIG. 3, after screen-printing the first layer of ink YM1 as a whole on the first surface F1 of the transparent decorative member 31, performing a second screen printing process on a position Z1 corresponding to each light entrance R1 of the light guide film to screen-print a second layer of ink YM2 on the position Z1 corresponding to each light entrance R1. In this way, the ink area comprises the first layer of ink YM1 formed on the whole first surface of the transparent decorative member attached to the light guide film, and the second layer of ink YM2 formed on the first layer of ink YM1 and at a position corresponding to each light entrance.

Thus, two layers of ink will be screen-printed on the position Z1 on the first surface F1 of the transparent decorative member 31 corresponding to each light entrance R1 of the light guide film, such that the ink screen-printed on the position Z1 on the first surface F1 of the transparent decorative member 31 corresponding to each light entrance R1 of the light guide film is thicker than other positions, thereby effectively ensuring light emission uniformity of the transparent decorative member 31.

In other embodiments, the performing screen printing processing for the transparent decorative member 31 can also comprise: performing screen printing processing in one time on the first surface F1 of the transparent decorative member 31, and when performing screen printing on the position Z1 corresponding to each light entrance R1 of the light guide film, repeatedly screen-printing multiple times so that the thickness of ink on the position Z1 corresponding to each light entrance R1 of the light guide film is larger than the thickness of ink on other positions.

That is, in other embodiments, the screen printing processing for the transparent decorative member 31 is completed in one time, but the number of times of screen printing at different positions are different so as to make the thicknesses are different. In particular, since the number of times of performing screen printing on the position Z1 corresponding to each light entrance R1 of the light guide film is larger than the number of times of screening printing on other positions, the thickness of ink on the position Z1 of the transparent decorative member 31 corresponding to each light entrance R1 of the light guide film is larger than the thickness of ink on other positions.

In this embodiment, the position Z1 of the first surface F1 of the transparent decorative member 31 corresponding to each light entrance R1 of the light guide film refers to an area on the first surface F1 of the transparent decorative member 31 which coincides with a projection of the light entrance R1 on the transparent decorative member 31 or is slightly larger than the projection of the light entrance R1 on the transparent decorative member 31.

In some embodiments, the thickness of ink screen-printed on other positions on the first surface F1 of the transparent decorative member 31 can also be zero, that is, the second thickness is zero. No screen printing processing is performed at other positions, and screen printing processing is only performed on the position Z1 of the first surface F1 of the transparent decorative member 31 corresponding to each light entrance R1 of the light guide film to form an ink layer of which the thickness is not zero.

Returning to refer to FIG. 2, as shown in FIG. 2, the light guide structure 3 further comprises an optical glue layer 33, the transparent decorative member 31 and the light guide film 32 are fixed together through the optical glue layer 33. In this embodiment, the optical glue layer 33 is an OCR (optically clear adhesive) optical glue layer.

In some embodiments, the transparent decorative member 31 and the light guide film 32 are tightly fixed together through the optical glue layer 33 to form a transparent decorative assembly. Obviously, in other embodiments, the transparent decorative member 31 and the light guide film 32 can also be tightly fixed together by means of local dispensing, or be tightly fixed together by means of whole application of other transparent glue, etc. In some embodiments, the transparent decorative member 31 and the light guide film 32 can also be fixed together through fitting of a fitting structure. For example, the transparent decorative member is provided thereon with some protrusions, the light guide film is provided thereon with some grooves matching with the protrusions; through matching between the protrusions and the grooves, the transparent decorative member 31 and the light guide film 32 are fixed together by fitting.

In some embodiments, the transparent decorative member is made of polymethyl methacrylate (PMMA, commonly known as organic glass), the light guide film 32 is made of thermoplastic resin materials such as polycarbonate (PC) or the like.

Obviously, the transparent decorative member 31 or the light guide film 32 can also be made of any kind of materials including transparent glass, transparent resin, transparent plastics, and so on.

In this embodiment, as shown in FIG. 2, the light guide structure 3 further comprises light shielding glue 34, the light shielding glue 34 is attached to a surface F2 of the light guide film 32 which is not attached to the transparent decorative member 31, the light shielding glue 34 is provided with at least one opening K1, the position of the at least one opening K1 respectively corresponds to the position of the at least light entrance R1 for light of the light-emitting source 4 to pass.

Thus, the light shielding glue 34 is used to shield light, and only allows light of the light-emitting source 4 to diverge from the opening K1 to the light entrance R1 of the light guide film 32, and further diverge to other areas through the light entrance R1 of the light guide film 32, so as to ensure that light always enters from the light entrance R1 of the light guide film 32 and is guided to different areas, and further avoid the problem of uneven light emission.

In some embodiments, the light shielding glue 34 is black or white double-side light shielding glue.

The light guide structure 3 is adhered and fixed on the frame 2 by the light shielding glue 34.

Figure 4:
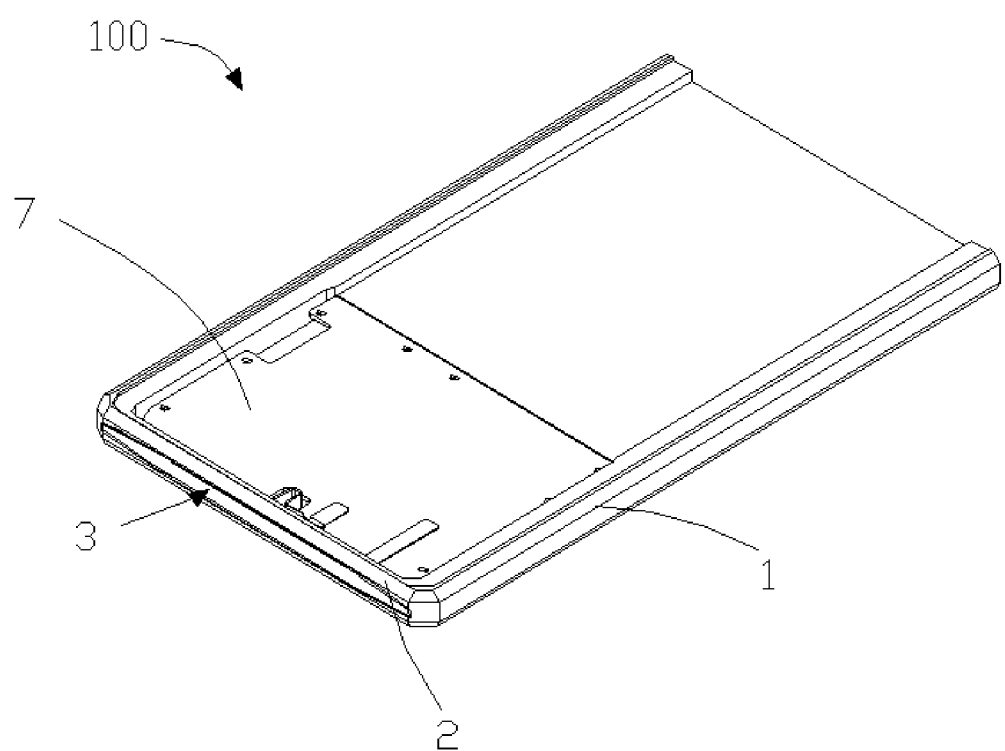
FIG. 4 is an overall schematic view of an electronic device of an embodiment of the present disclosure, of which the structure is partially shown in another view angle.
Figure 5:
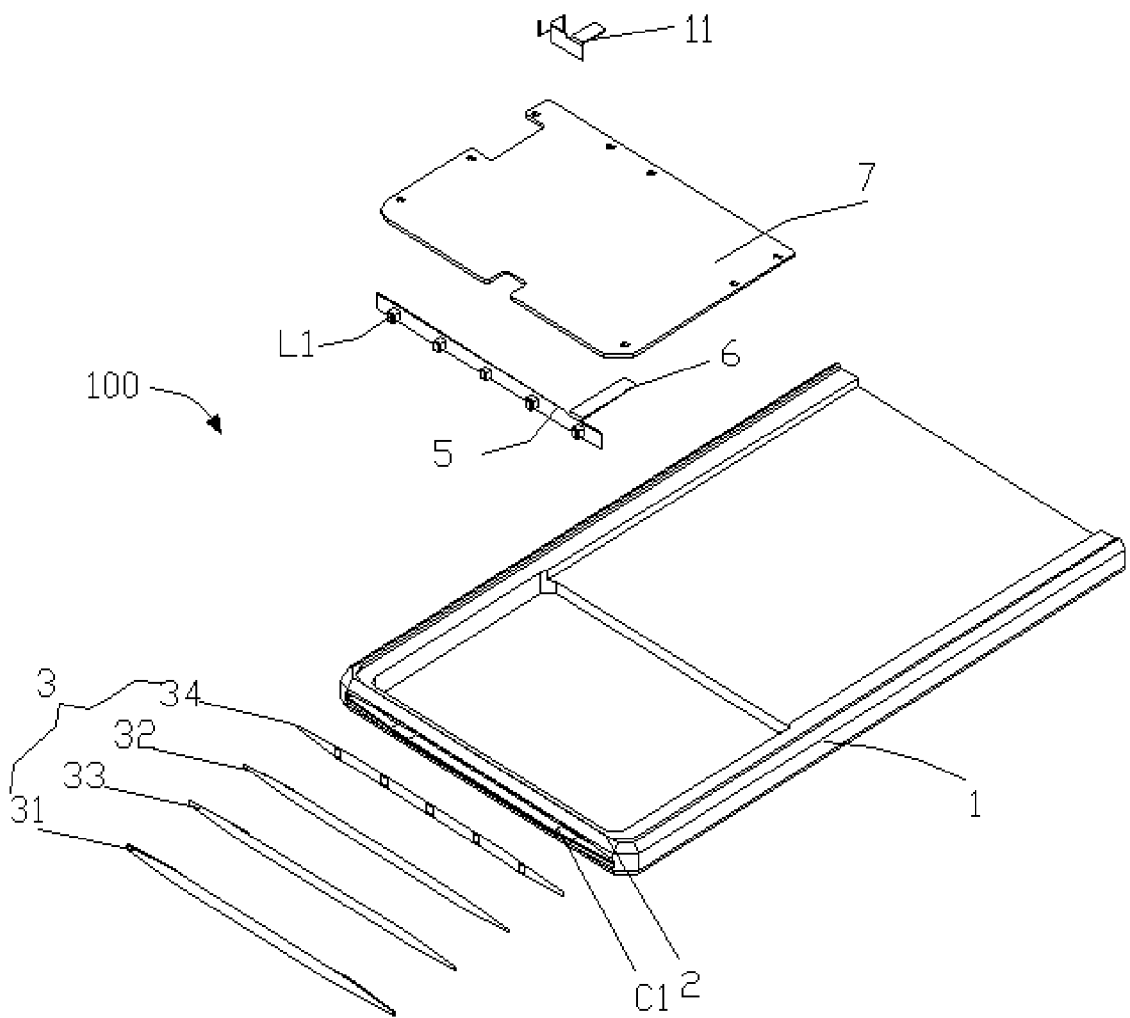
FIG. 5 is a disassembled schematic view of an electronic device of an embodiment of the present disclosure, of which the structure is partially shown in the view angle shown as FIG. 4.

Specifically, also referring to FIG. 4 and FIG. 5, FIG. 4 is an overall schematic view of an electronic device 100, of which the structure is partially shown in another view angle. FIG. 5 is a disassembled schematic view of an electronic device 100, of which the structure is partially shown in the another view angle. As shown in FIG. 4 and FIG. 5, a recess C1 configured to receive the light guide structure 3 is formed on the frame 2. After one surface of the light shielding glue 34 is adhered and attached to the light guide film 32, another surface of the light shielding glue 34 is adhered to a bottom surface M1 of the recess C1 of the frame 2 so that the light guide structure 3 is tightly fixed in the recess C1 of the frame 2.

In this embodiment, after the light guide structure 3 is received in the recess C1 of the frame 2, an outer surface of the transparent decorative member 31 of the light guide structure 3 is combined with an outer surface of the frame 2 to form a flat frame 2.

Figure 6:
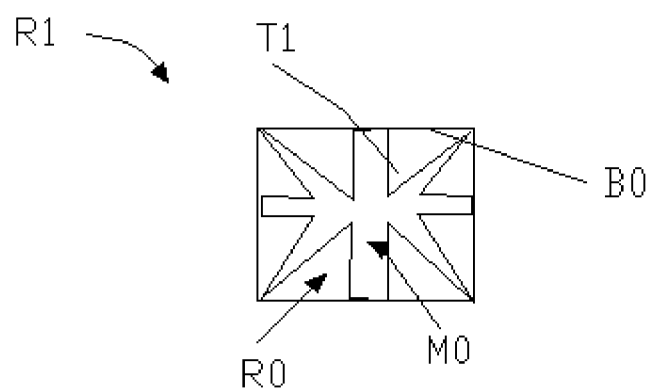
FIG. 6 is a schematic view of a light entrance of a light guide film of an embodiment of the present disclosure.

Referring to FIG. 6, which is a schematic view of the light entrance R1 of the light guide film 32. In this embodiment, as shown in FIG. 5, the at least one light entrance R1 of the light guide film 32 comprises an aperture R0, and a plurality of spacedly distributed protrusions T1 extend from an aperture wall B1.

Thus, when light reaches the light entrance R1, it is reflected or refracted by the plurality of protrusions T1 and thus diverges to various directions of the light guide film 32, uniformity of light emission can be further improved.

As shown in FIG. 6, in some embodiments, the plurality of protrusions T1 are triangular protrusions, and gaps among the plurality of protrusions T1 interconnect with each other to form a Union Jack shaped gap M0. Obviously, in some embodiments, the plurality of protrusions T1 can also be rectangular protrusions, cylindrical protrusions, etc.

In this embodiment, as shown in FIG. 2, the number of the at least one light entrance R1 is multiple, and the multiple light entrances R1 are evenly distributed on the light guide film 32.

In some embodiments, sizes and shapes of the transparent decorative member 31, the light guide film 32, and the light shielding glue 34 are identical, the transparent decorative member 31, the light guide film 32, and the light shielding glue 34 are laminated in sequence, and their projections along the lamination direction coincide. In some embodiments, shapes of the transparent decorative member 31, the light guide film 32, and the light shielding glue 34 are narrow ellipses, and are approximately inscribed ellipses of the frame 2.

As shown in FIG. 2, the frame 2 defines at least one frame hole K2, the position of the at least one frame hole K2 corresponds one by one to the position of the at least one light entrance R1 of the light guide film 32. The electronic device 100 comprises the light-emitting source 4, the light-emitting source 4 comprises at least one light emission lamp L1, each light emission lamp L1 is arranged to correspond to one frame hole K2. In this embodiment, the at least one frame hole K2 is an aperture running through the frame 2.

In some embodiments, each light emission lamp L1 is embedded in a corresponding frame hole K2. Obviously, in other embodiments, the light-emitting source 4 can be a longilineal light emission lamp and covers all frame holes K2 correspondingly.

Light emitted by the at least one light emission lamp L1 is emitted to the light entrance R1 of the light guide film 32 through the frame hole K2 of the frame 2, thus is guided to the transparent decorative member 31 through the light guide film 32, and is guided to exit from the transparent decorative member 31 to perform light emission indication.

As shown in FIG. 2, the electronic device 100 further comprises an adapter plate 5, a flexible circuit board 6, and a main circuit board 7.

The at least one light emission lamp L1 is disposed on the adapter plate 5 and is electrically connected with the adapter plate 5, and a surface of the adapter plate 5 is approximately parallel to an inner surface N1 of the frame 2; after the at least one light emission lamp L1 is disposed on the adapter plate 5, a part of the at least one light emission lamp L1 being away from the adapter plate 5 is embedded in a corresponding frame hole K2. In this embodiment, the part of the at least one light emission lamp 11 being away from the adapter plate 5 comprises a light emission surface of the light emission lamp L1, the at least one light emission lamp L1 emits light towards a direction from the frame hole K2 to the light entrance R1 of the light guide film 32.

The flexible circuit board 6 is electrically connected with the adapter plate 5 and the main circuit board 7. Thus, the at least one light emission lamp L1 is electrically connected with the main circuit board 7 through the adapter plate 5 and the flexible circuit board 6, and then can obtain electric energy from the main circuit board 7 to emit light.

Figure 7:
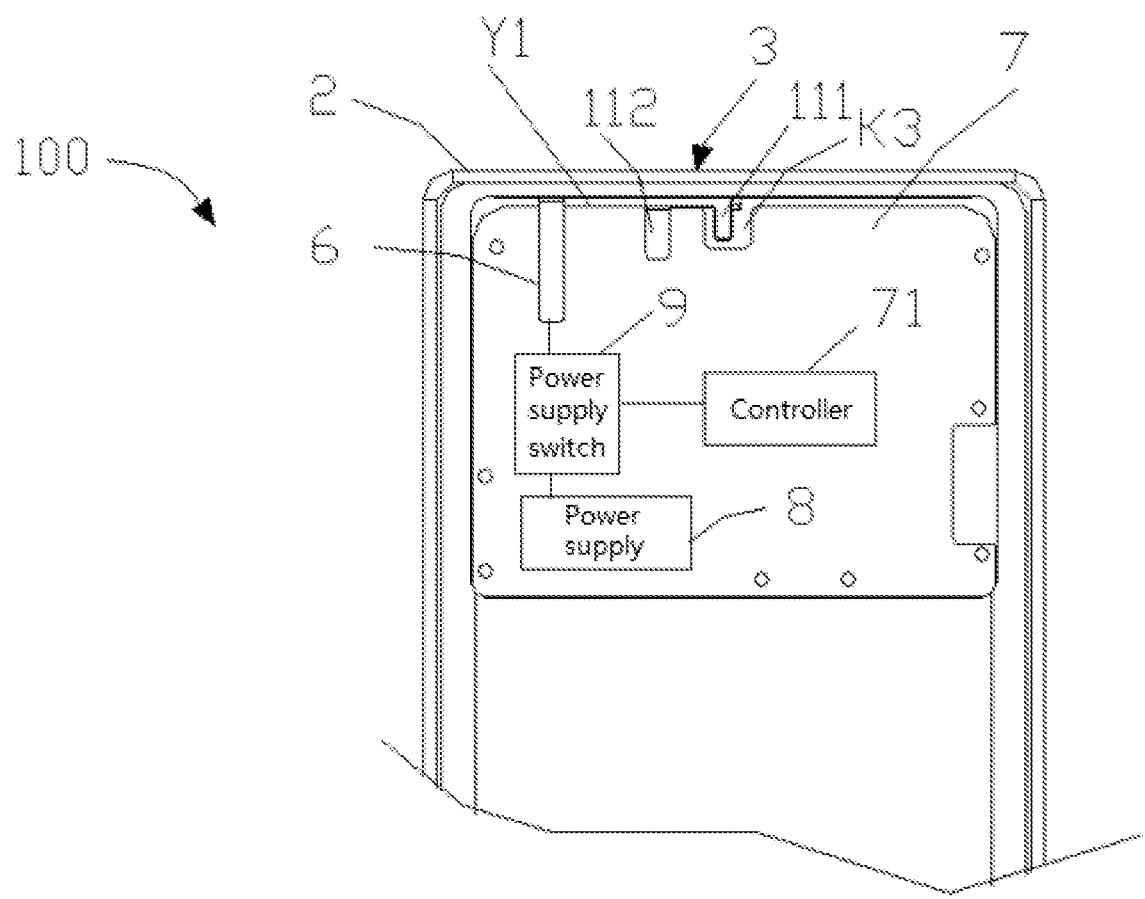
FIG. 7 is a schematic view of an electronic device of an embodiment of the present disclosure showing some components of a main circuit board.

Referring to FIG. 7, which is a schematic view of the electronic device 100 showing some components of the main circuit board 7. As shown in FIG. 7, the electronic device 100 further comprises a controller 71, a power supply 8, and a power supply switch 9.

The controller 71, the power supply 8, and the power supply switch 9 are all disposed on the main circuit board 7. The power supply 8 is configured to provide a working voltage of the at least one light emission lamp L1, the power supply switch 9 is electrically connected between the flexible circuit board 6 and the power supply 8, the controller 7 is electrically connected with the power supply switch 9 and configured to control the power supply switch 9 to turn on or turn off, so that the power supply 8 supplies power or stops supplying power to the at least one light emission lamp L1.

In this embodiment, the power supply 8 can be a small battery, such as a button battery, or a voltage point provided by a battery of the electronic device 100, or can be a power management chip, etc.

In this embodiment, in some embodiments, the controller 71 controls the power supply switch 9 to turn on when determining that a preset event occurs, so as to conduct a power supply path of the power supply 8 for supplying power to the at least one light emission lamp L1, such that the at least one light emission lamp L1 is powered on and emits light, which is guided to exit by the light guide structure 3 to perform light emission indication.

In this embodiment, the preset event comprises events such as missed call events, missed information (comprising information such as short messages, news, etc.) events, and so on.

In other embodiments, the controller 71 controls the power supply switch 9 to turn on when receiving starting instruction of a specific application program, so as to conduct a power supply path of the power supply 8 for supplying power to the at least one light emission lamp L1, such that the at least one light emission lamp L1 is powered on and emits light, which is guided to exit by the light guide structure 3 to perform light emission. In this embodiment, the specific application program can be an application program such as a flashlight or the like, and the light emitted by the at least one light emission lamp L1 can also be used as an illumination lamp after being guided to exit by the light guide structure 3.

Obviously, in some embodiments, the controller 71, after controlling the power supply switch 9 to turn on when determining that a preset event occurs, and when detecting an operation of a user on the electronic device 100, controls the power supply switch 9 to turn off, and thus stops supplying power to the light emission lamp L1 so as to stop performing light emission indication. For example, if a user unlocks the electronic device 100, or an operation such as a user picking up the electronic device 100 is detected by a motion sensor, it is indicated that the user has noticed the light emission indication. At this time, power supply to the light emission lamp L1 is stopped, and thus the light emission indication is stopped, thereby avoiding energy loss.

In some embodiments, the controller 71 controls the power supply switch 9 to disconnect when receiving turning-off instruction for a specific application program, for example, when receiving turning-off instruction of turning off an application program such as a flashlight or the like, so as to stop supply power to the light emission lamp L1 and thus stop light emission.

Figure 8:
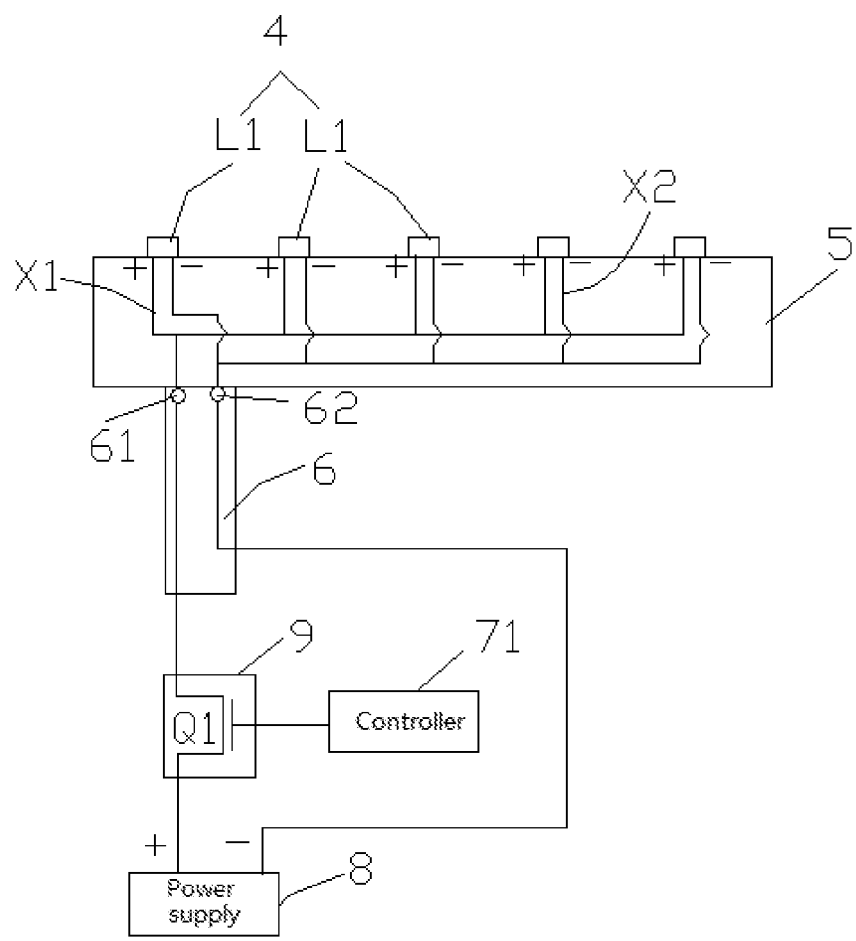
FIG. 8 is an equivalent schematic view of a circuit formed by a power supply, a power supply switch, a flexible circuit board, an adapter plate, and at least one light emitting lamp of an embodiment of the present disclosure.

Also referring to FIG. 8, which is an equivalent schematic view of a circuit formed by the power supply 8, the power supply switch 9, the flexible circuit board 6, the adapter plate 5, and the at least one light emission light L1.

As shown in FIG. 8, the power supply switch 9 can be electrically connected between a positive electrode of the power supply 8 and a positive connection point 61 of the flexible circuit board 6, at least one first conductive wire X1 is disposed on the adapter plate 5, the at least one first conductive wire X1 is respectively connected between the positive connection point 61 and a positive electrode of each light emission lamp L1; a negative electrode of each light emission lamp L1 is connected to a negative connection point 62 of the flexible circuit board 6 through at least one second conductive wire X2 disposed on the adapter plate 5, and the negative connection point 62 of the flexible circuit board 6 is connected with a ground on the main circuit board 7, for example, connected with a negative electrode of the power supply 8.

Thus, when the controller 71 controls the power supply switch 9 to conduct, a power supply voltage of the power supply 8 is respectively provided to the at least one light emission lamp L1 through the positive connection point 61 of the flexible circuit board 6 and the at least one first conductive wire X1, so that the at least one light emission lamp L1 is powered on and emits light.

In this embodiment, the power supply switch 9 can be a numerically controlled single pole double throw switch, and can also be semiconductor switch transistors such as MOS transistors, BJT transistors, etc.

In this embodiment, the power supply switch 9 being an MOS transistor Q1 is taken as an example in FIG. 8, the controller 71 is connected with a gate of the MOS transistor Q1, a source and a drain of the MOS transistor Q1 are respectively connected with the positive electrode of the power supply 8 and the positive connection point 61 of the flexible circuit board 6, the controller 71 controls the MOS transistor Q1 to conduct by generating a first electric level signal transmitted to the MOS transistor Q1, and controls the MOS transistor Q1 to disconnect by generating a second electric level signal transmitted to the MOS transistor Q1. In this embodiment, when the MOS transistor Q1 is an NMOS transistor, the first electric level signal is a high electric level signal, and the second electric level signal is a low electric level signal. When the MOS transistor Q1 is a PMOS transistor, the first electric level signal is a low electric level signal, and the second electric level signal is a high electric level signal.

In some embodiments, the at least one light emission light L1 is an LED (light-emitting diode) lamp.

As shown in the drawings such as FIG. 2, the number of the frame hole K2 and the number of the light emission lamp L1 are multiple, and are the same as the number of the light entrance R1 of the light guide film 32, and their positions correspond one by one. When the frame holes K2 are multiple, they are distributed on the frame 1 with even intervals.

Figure 9:
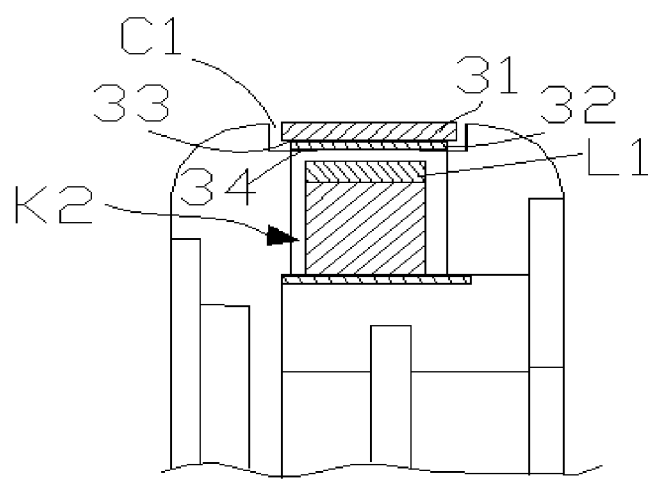
FIG. 9 is a schematic view of an embodiment of the present disclosure, which is cut along the cross-section line IX-IX in FIG. 1.

Also referring to FIG. 9, which is a schematic view cut along the cross-section line IX-IX in FIG. 1. As shown in FIG. 9, each frame hole K2, after running through the frame 2, interconnects the recess C1 in the frame 2, and is aligned with a corresponding opening K1 in the light shielding glue 34 and a corresponding light entrance R1 in the light guide film 32, so that light emitted by a light emission lamp L1 disposed to be correspond to the frame hole K2 passes through the frame hole K2 and the opening K1 in the light shielding glue 34 to be emitted to the corresponding light entrance R1 in the light guide film 32.

Returning to refer FIG. 2, as shown in FIG. 2, in some embodiments, the casing 1 is a middle frame and comprises at least three frames 2 and a back plate 21 connected with the three frames 2. The light guide structure 3 is disposed on one of the frames 2. In this embodiment, the back plate 21 is specifically connected with parts of the three frames 2 being close to middle parts thereof, so as to form a bearing plate positioned at a middle part of the electronic device 100.

As shown in FIG. 2, the bearing plate 21 is provided thereon with a recess portion 22, the main circuit board 7 is received in the recess portion 22.

As shown in FIG. 1 and FIG. 2, the casing 1 further comprises a locking component 11, the locking component 11 comprises a fixing part 111 and a limiting part 112, an edge Y1 of the main circuit board 7 being close to the frame 2 provided with the light guide structure 3 defines a gap K3, the fixing part 111 of the locking component 11 is fixed on the back plate 21 through the gap K3, the limiting part 112 is fixedly connected with the locking component 11, and extends from a surface of the main circuit board 7 away from the back plate 21, so as to fix the main circuit board 7. In this embodiment, other parts of the main circuit board 7 are fixed on the back plate 21 by means of screw fastening or the like.

In this embodiment, the limiting part 112 is fixedly connected to the fixing part 111 through a connection plate 113 being parallel to the edge Y1 of the main circuit board 7. The limiting part 112 can specifically be formed by extending a certain distance from an end area of an edge of the connection plate 113 away from the back plate 21 towards a direction away from the back plate 21 and then extending along a direction being parallel to the back plate 21 to the main circuit board 7.

In some embodiments, the frame 2 provided with the light guide structure 3 is a top frame of the casing 1. Specifically, the frame 2 provided with the light guide structure 3 is the frame positioned at the top of the electronic device 100 when the electronic device 100 is placed uprightly. Obviously, in other embodiments, the frame 2 provided with the light guide structure 3 can also be a left, right, or bottom frame of the casing 1/electronic device 100.

In some embodiments, the casing 1 can be a rear casing of the electronic device 100, which comprises a back casing plate; the four frames 2 can be four frames 2 extending perpendicularly from four edges of the back casing plate towards directions away from the back casing plate.

In this embodiment, the electronic device 100 can be electronic products such as a mobile phone, a tablet computer, etc.

It should be noted that a certain embodiment of the present disclosure may only emphatically introduce changes of one part or a few parts, other not introduced or not emphatically introduced parts are also adapted to this embodiment when having different transformation manners in other embodiments.

Obviously, the electronic device 100 can further comprises other elements, for example, a memory, a display screen, etc. Since they are not related to the improvement of the present disclosure, they are not described herein.

In the light guide structure 3, the casing 1, and the electronic device 100 provided by the present disclosure, the light guide structure 3 is disposed on the frame 2 of the casing 1 such that the light emitted by the light-emitting source is guided to exit from the light guide structure 3 on the frame 2, thereby freeing front-screen space and effectively increasing the screen-to-body ratio. In addition, as screen printing processing is performed on the transparent decorative member 31 of the light guide structure 3, light emission uniformity can be effectively improved.

In some embodiments, the present disclosure further provides a method for manufacturing a light guide structure, such as the aforementioned light guide structure 3. The method can comprise: providing the transparent decorative member 31 and the light guide film 32; performing screen printing processing on the first surface F1 of the transparent decorative member 31; and attaching the light guide film 32 to the first surface F1 of the transparent decorative member 31.

The above are implementation manners of embodiments of the present disclosure. It should be noted that for one of ordinary skill in the art, various improvements and embellishments can also be made without departing from the principle of embodiments of the present disclosure, and these improvements and embellishments are also considered as the protection scope of the present disclosure.

What is claimed is:

1. A casing comprising: a frame and a light guide structure disposed on the frame; wherein, the light guide structure comprises a transparent decorative member and a light guide film which are attached together, at least one light entrance is provided on the light guide film for guiding light emitted by a light-emitting source; and a first surface of the transparent decorative member attached to the light guide film is provided with an ink area, so that the light entering at the light entrance of the light guide film uniformly exits from the transparent decorative member, wherein the at least one light entrance, the light-emitting source, and the ink area are aligned, and wherein the ink area is light-transmissive.

2. The casing according to claim 1, wherein, a thickness of a part of the ink area formed on a position on the first surface corresponding to each light entrance of the light guide film is larger than a thickness of a part of the ink area formed on other positions on the first surface.

3. The casing according to claim 2, wherein, the ink area comprises a first layer of ink formed on the whole first surface of the transparent decorative member attached to the light guide film, and at least one second layer of ink formed on the first layer of ink and at a position corresponding to each light entrance.

4. The casing according to claim 1, wherein, the light guide structure further comprises light shielding glue, the light shielding glue is attached to a surface of the light guide film which is away from the transparent decorative member, the light shielding glue is provided with at least one opening, the position of the at least one opening respectively corresponds to the position of the at least light entrance for light of the light-emitting source to pass.

5. The casing according to claim 1, wherein, the at least one light entrance of the light guide film comprises an aperture, and a plurality of spacedly distributed protrusions extend from an aperture wall.

6. The casing according to claim 1, wherein, the frame defines at least one frame hole, a position of the at least one frame hole corresponds to a position of the at least one light entrance of the light guide film.

7. An electronic device, comprising:
a middle frame comprising at least one side plate, wherein the side plate is configured to disposed on a periphery of the electronic device;
a light-emitting source disposed on an inner side of the side plate; and
a light guide structure disposed on an outer side of the side plate; wherein the light-emitting source and the light guide structure are respectively disposed at two opposite sides of the side plate, and the light guide structure is configured to guide light emitted from the light-emitting source to outside of the frame,
wherein the light guide structure comprises a transparent decorative member and a light guide film that are attached together, the light guide film defines at least one light entrance configured for guiding light emitted by the light-emitting source, and the transparent decorative member has a printing surface that is provided with an ink area,
wherein a thickness of a part of the ink area formed on a position of the printing surface corresponding to each light entrance of the light guide film is larger than a thickness of a part of the ink area formed on other positions of the printing surface, and
wherein the light-emitting source, the at least one light entrance, and the ink area are aligned, and the ink area is light transmissive.

8. The electronic device according to claim 7, wherein, the ink area comprises a first layer of ink formed on the whole printing surface of the transparent decorative member attached to the light guide film, and at least one second layer of ink formed on the first layer of ink and at a position corresponding to each light entrance.

9. The electronic device according to claim 7, wherein, the middle frame comprises at least three side plates and a back plate connected with the side plates, the light guide structure is disposed on one of the side plates; and the back plate is connected with parts of the side plates being close to middle parts thereof, so as to form a bearing plate positioned at a middle part of the electronic device.

10. The electronic device according to claim 7, wherein a part of the outer side of the side plate recesses to form a recess, the light guide structure is disposed in the recess, and an outer surface of the light guide structure is flush with another part of the outer side of the side plate.

11. An electronic device, comprising:
a casing comprising a side plate, the side plate having a first surface and a second surface being opposite to the first surface, and the side plate recessing from the first surface towards the second surface to define a recess;
a light guide assembly disposed in the recess; and
a light-emitting source arranged on the second surface and received in the casing, wherein the light-emitting source and the light guide assembly are respectively located at two sides of the second surface, and the light guide assembly is configured to guide light emitted from the light-emitting source to outside of the casing,
wherein the light guide assembly comprises a transparent decorative member and a light guide film that are attached together, at least one light entrance is provided on the light guide film for guiding light emitted by the light-emitting source, and a printing surface of the transparent decorative member is provided with an ink area, and
wherein the light-emitting source, the at least one light entrance, and the ink area are aligned, and the ink area is light transmissive.

12. The electronic device according to claim 11, wherein, a thickness of a part of the ink area formed on a position of the printing surface corresponding to each light entrance of the light guide film is larger than a thickness of a part of the ink area formed on other positions of the printing surface.

13. The electronic device according to claim 11, wherein, the ink area comprises a first layer of ink formed on the whole printing surface of the transparent decorative member attached to the light guide film, and at least one second layer of ink formed on the first layer of ink and at a position corresponding to each light entrance.

14. The electronic device according to claim 11, wherein, the light guide assembly further comprises light shielding glue, the light shielding glue is attached to a surface of the light guide film which is not attached to the transparent decorative member, the light shielding glue is provided with at least one opening, and the position of the at least one opening respectively corresponds to the position of the at least light entrance for light of the light-emitting source to pass.

15. The electronic device according to claim 14, wherein, one surface of the light shielding glue is adhered and attached to the light guide film, and another surface of the light shielding glue is adhered to a bottom surface of the recess so that the light guide assembly is tightly fixed in the recess.

16. The electronic device according to claim 15, wherein, the casing defines at least one frame hole, the position of the at least one frame hole corresponds one by one to the position of the at least one light entrance of the light guide film; and the light-emitting source comprises at least one light emission lamp, each light emission lamp is arranged to correspond to one frame hole.

17. The electronic device according to claim 16, wherein, the electronic device further comprises an adapter plate, the at least one light emission lamp is disposed on the adapter plate and electrically connected with the adapter plate; and a part of the at least one light emission lamp being away from the adapter plate is embedded in a corresponding frame hole.

18. The electronic device according to claim 17, wherein, the electronic device further comprises a flexible circuit board and a main circuit board, the flexible circuit board is electrically connected with the adapter plate and the main circuit board, and the at least one light emission lamp is electrically connected with the main circuit board through the adapter plate and the flexible circuit board, so as to obtain electric energy from the main circuit board and emit light.

* * * * *